(12) United States Patent
Setteboun et al.

(10) Patent No.: US 11,323,266 B2
(45) Date of Patent: May 3, 2022

(54) SYSTEM AND METHOD FOR SECURED DIGITAL COMMUNICATION USING A DIGITAL SIGNATURE

(71) Applicant: Brownie Technologies Ltd., Petach-Tikva (IL)

(72) Inventors: Hana-Muriel Setteboun, Tel-Aviv (IL); Netanel Robin, Tel-Aviv (IL)

(73) Assignee: Brownie Technologies Ltd., Petach-Tikva (IL)

( * ) Notice: Subject to any disclaimer, the term of this patent is extended or adjusted under 35 U.S.C. 154(b) by 270 days.

(21) Appl. No.: 16/423,288

(22) Filed: May 28, 2019

(65) Prior Publication Data
US 2020/0382314 A1  Dec. 3, 2020

(51) Int. Cl.
*H04L 9/32* (2006.01)
*H04W 12/03* (2021.01)
*H04W 84/12* (2009.01)
*H04W 84/04* (2009.01)

(52) U.S. Cl.
CPC .......... *H04L 9/3247* (2013.01); *H04L 9/3236* (2013.01); *H04W 12/03* (2021.01); *H04L 2209/80* (2013.01); *H04W 84/042* (2013.01); *H04W 84/12* (2013.01)

(58) Field of Classification Search
CPC . H04L 9/3247; H04L 9/3236; H04L 2209/80; H04L 63/126; H04L 9/3242; H04W 12/03; H04W 84/12; H04W 84/042; H04W 12/108
See application file for complete search history.

(56) References Cited

U.S. PATENT DOCUMENTS

| | | | |
|---|---|---|---|
| 8,151,352 B1 * | 4/2012 | Novitchi | G06F 21/566 726/24 |
| 10,326,597 B1 * | 6/2019 | Roth | H04L 9/0841 |
| 2002/0085710 A1 * | 7/2002 | Ananth | H04L 9/065 380/37 |
| 2003/0070075 A1 * | 4/2003 | Deguillaume | G06T 1/0064 713/176 |

* cited by examiner

*Primary Examiner* — Mohammad W Reza

(57) ABSTRACT

A secured digital communication system, comprising: at least one secured network connected device, comprising at least one hardware processor connected to at least one digital communication network interface, and adapted for: in at least one of a plurality of iterations: appending an identified cryptographic key value to a first sequence of digital bytes to produce an extended sequence of digital bytes; computing a cryptographic signature value by applying a fixed length low computation complexity chunk-based hash function to the extended sequence of digital bytes; appending the cryptographic signature value to the first sequence of digital bytes to produce a signed sequence of digital bytes; and sending at least one message comprising the signed sequence of digital bytes to at least one other secured network connected device via the at least one digital communication network interface.

15 Claims, 7 Drawing Sheets

SYSTEM AND METHOD FOR SECURED DIGITAL COMMUNICATION USING A DIGITAL SIGNATURE

FIELD AND BACKGROUND OF THE INVENTION

The present invention, in some embodiments thereof, relates to a digital communication network and, more specifically, but not exclusively, to a digital communication network providing secure connectivity to a plurality of home utility metering devices.

There is a continuous increase in use of digital communication networks in a variety of services and solutions. Some examples of areas where one or more digital communication networks may be used by a service are home automation solutions—automating the ability to control items around the house—such as Amazon Echo and Philips Hue, telecommunication services, health care solutions such as Philips eCareCoordinator and Connected Home Living, and critical utility infrastructures such as electrical power grids, water utilities and gas supply networks. Some such systems, specifically, but not exclusively, critical utility infrastructures, are becoming susceptible to cyber-attacks, i.e. one or more attacks targeting, and additionally or alternatively exploiting, digital technology such as a digital communication network and digital information. An attacker is an entity—a person or an organization—attempting to benefit from disrupting a service and additionally or alternatively from gaining unauthorized access to the service. An attacker may attack a system via a digital communication network used by the system for the purpose of achieving one or more goals, some examples of goals being disrupting a service provided by the system, gaining unauthorized access to the service, gaining unauthorized access to private data of the service, and forging financial transactions for example for billing frauds. For example, when the system is a power grid supplying electrical power to a plurality of clients, an attacker may cause a power outage for one or more clients or disruption to power supply to the one or more clients. An attacker may cause an entire power grid to shut down.

In addition, there is an increase in use of network connected home utility metering devices. Some examples of a network connected home utility metering device are an electrical power meter, a water meter, and a gas meter. Such metering devices are also known as smart utility meters. A smart utility meter is also known as an advanced utility meter. Advanced metering infrastructure (AMI) is an architecture for automated, two-way communication between a smart utility meter and a computerized server of company providing a utility service. A home area network (HAN) is a digital communication network that operates within a house or small office/home office (SOHO) and connects digital devices within the home or office. Some smart utility meters are additionally connected to one or more appliances, over a HAN. For example, a smart electricity utility meter may be connected to one or more electrical appliances in a home, such as a refrigerator or an air conditioner. A smart gas utility meter may be connected to one or more gas appliances, such as a furnace or an oven. Some HANs connect digital devices using a wired digital communication network technology, for example coaxial cable, twisted pair cable and power line communication. Some HANs connect digital devices using a wireless digital communication network technology, for example a network based on Institute of Electrical and Electronics Engineers (IEEE) 802.11 technical standard and a network based on IEEE 802.15.4 technical standard. In another possible threat, an attacker on a system having one or more smart utility meters may forge a meter reading to lower a bill and fraudulently reduce an amount of money due to a utility company providing the utility service.

There is a need to reduce a risk of a cyber-attack on a network provided service.

SUMMARY OF THE INVENTION

It is an object of the present invention to provide a system and a method for providing secure network communication between two or more network connected devices.

The foregoing and other objects are achieved by the features of the independent claims. Further implementation forms are apparent from the dependent claims, the description and the figures.

According to a first aspect of the invention, a secured digital communication system comprises at least one secured network connected device, comprising at least one hardware processor connected to at least one digital communication network interface, and adapted for: in at least one of a plurality of iterations: appending an identified cryptographic key value to a first sequence of digital bytes to produce an extended sequence of digital bytes; computing a cryptographic signature value by applying a fixed length low computation complexity chunk-based hash function to the extended sequence of digital bytes; appending the cryptographic signature value to the first sequence of digital bytes to produce a signed sequence of digital bytes; and sending at least one message comprising the signed sequence of digital bytes to at least one other secured network connected device via the at least one digital communication network interface.

According to a second aspect of the invention, a method for a secured digital communication system comprises: on at least one secured network connected device, in at least one of a plurality of iterations: appending an identified cryptographic key value to a first sequence of digital bytes to produce an extended sequence of digital bytes; computing a cryptographic signature value by applying a fixed length low computation complexity chunk-based hash function to the extended sequence of digital bytes; appending the cryptographic signature value to the first sequence of digital bytes to produce a signed sequence of digital bytes; and sending the signed sequence of digital bytes to at least one other secured network connected device via at least one digital communication network interface.

With reference to the first and second aspects, in a first possible implementation of the first and second aspects of the present invention applying the fixed length low computation complexity chunk-based hash function comprises: partitioning the extended sequence of digital bytes into a sequence of chunks, each comprising an array of digital words, each digital word comprising a sequence of binary bits; initializing each of a sequence of hash values with a respective predefined hash value of a sequence of predefined hash values; for each chunk of the sequence of chunks, in an identified chunk order of the sequence of chunks, updating the sequence of hash values by applying a low computation complexity chunk-hash function to the array of the chunk and the sequence of hash values updated for a previous chunk; and computing the cryptographic signature value using the updated sequence of hash values. Optionally, the identified chunk order is according to the sequence of chunks. Partitioning the extended sequence of digital bytes into a sequence of chunks and applying a low computation complexity chunk-hash function to each of the chunks facilitates computing a fixed length cryptographical signature value regardless of an amount of bytes of the sequence of digital bytes. Using a fixed length cryptographical signature value limits an adverse impact to effective network throughput due to using some of a digital communication network's bandwidth to send the cryptographic signature value, increasing availability of a service provided by a system implemented according to the present invention.

With reference to the first and second aspects, or the first implementation of the first and second aspects, in a second possible implementation of the first and second aspects of the present invention the array comprises 16 digital words, and applying the low computation complexity chunk-hash function to the array and the sequence of hash values comprises: extending the array to comprise 20 digital words by appending to the array 4 extension words, each computed for one of four selected index values, by applying a first plurality of bitwise operations to a plurality of values of the array selected according to respective selected index value; initializing a sequence of chunk-hash values using the sequence of hash values; for each digital word of the array, in order of the 20 digital words in the array, updating the sequence of chunk-hash values by applying a second plurality of bitwise operations to the digital word and to the sequence of chunk-hash values updated for a previous digital word, according to a position of the digital word in the array; and adding each of the sequence of chunk-hash values to the respective hash value of the sequence of hash values. Extending the array of digital words increases randomness of the computed cryptographic signature value, increasing reliability of a system implemented according to the present invention. Using the first plurality of bitwise operations and the second plurality of bitwise operations to apply the low computation complexity chunk-hash function to the array and the sequence of hash values allows reducing an amount of computation resources required to apply the low computation complexity chunk-hash function, thus reducing cost of manufacturing and cost of operation of a secured device.

With reference to the first and second aspects, or the first implementation of the first and second aspects, in a third possible implementation of the first and second aspects of the present invention each digital word of the array of digital words comprises a sequence of 32 binary bits, and partitioning the extended sequence of digital bytes into a sequence of chunks comprises: producing an aligned sequence of digital bytes having an amount of binary bits which is an integral multiple of 512 by appending to the extended sequence of digital bytes a plurality of binary bits, each having a value of 0, and 64 bits representing a length value; and partitioning the aligned sequence of digital bytes into the sequence of chunks, each comprising 16 digital words each comprising a sequence of 32 binary bits. Producing an aligned sequence of digital bytes having an amount of binary bits which is an integral multiple of 512 facilitates partitioning the extended sequence of digital bytes into equal chunks, thus facilitating computing a fixed length cryptographic signature value. Optionally, partitioning the extended sequence of digital bytes into a sequence of chunks further comprises: before producing the aligned sequence of digital bytes, converting each byte of the extended sequence of digital bytes, comprising a sequence of 8 bits, into a sequence of 8 8-bit American Standard Code for Information Interchange (ASCII) values, each representing a respective binary bit of the sequence of 8 bits, to produce a sequence of character bytes; and using the sequence of character bytes as the extended sequence of digital bytes when producing the aligned sequence of digital bytes. Converting each byte into a sequence of 8 8-bit ASCII values allows implementing the present invention using a programming resource having a textual input mechanism where there is a need to prevent interpreting a byte value of zero as an indication of a boundary of a textual string, for example some optimized versions of embedded ARM compiled code. Some such programming resources are optimized, which facilitates reducing processing time and thus increasing processing throughput of the device. Optionally, the length value is indicative of an amount of bits in the extended sequence of digital bytes.

With reference to the first and second aspects, or the first implementation of the first and second aspects, in a fourth possible implementation of the first and second aspects of the present invention computing the cryptographic signature value using the updated sequence of hash values comprises: producing a sequence of ASCII signature values by converting each of the sequence of updated hash values into an ASCII-code representation of a hexadecimal representation of the updated hash value; and concatenating the sequence of ASCII signature values to produce the cryptographic signature value. Using a sequence of ASCII signature values allows reducing an amount of computation resources required to compute the cryptographic signature value thus reducing cost of manufacturing and cost of operation of a device and increasing processing throughput of the device.

With reference to the first and second aspects, in a fifth possible implementation of the first and second aspects of the present invention at least one digital communication network interface is connected to a Global System for Mobile communications (GSM) network. Connecting to a GSM network allows a device to connect to a remote device without requiring infrastructure of a wired network connection, reducing cost of installation of a system implemented according to the present invention.

With reference to the first and second aspects, in a sixth possible implementation of the first and second aspects of the present invention the first sequence of digital bytes is received from at least one additional hardware processor via at least one other digital communication network interface. Optionally, the at least one other digital communication network interface is connected to a wireless digital communication network based on Institute of Electrical and Electronics Engineers (IEEE) 802.15.4 technical standard. Optionally, the wireless digital communication network based on IEEE 802.15.4 technical standard is a Zigbee Alliance Zigbee network. Receiving the first sequence of digital bytes from at least one additional hardware processor facilitates a secure network connection between the at least one additional hardware processor and the at least one other hardware processor, increasing system reliability.

With reference to the first and second aspects, in a seventh possible implementation of the first and second aspects of the present invention the at least one other secured network connected device comprises at least one other hardware processor adapted for: in at least one of a plurality of receive iterations: extracting the signed sequence of digital bytes from at least one message received from the at least one secured network connected device; removing the cryptographic signature value from the signed sequence of digital bytes to produce a stripped sequence of digital bytes; appending the identified cryptographic key value to the stripped sequence of digital bytes to produce an extended stripped sequence of digital bytes; computing a new cryptographic signature value by applying the fixed length low computation complexity chunk-based hash function to the extended stripped sequence of digital bytes; and providing the at least one message to at least one software object executed by the at least one other hardware processor for the purpose of performing a message related task, subject to the new cryptographic signature value being equal to the cryptographic signature value. Providing the at least one message to the at least one software object subject to the new cryptographic signature value being equal to the cryptographic signature value computed according to the present invention increases system reliability and increases availability of a service provided by the system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
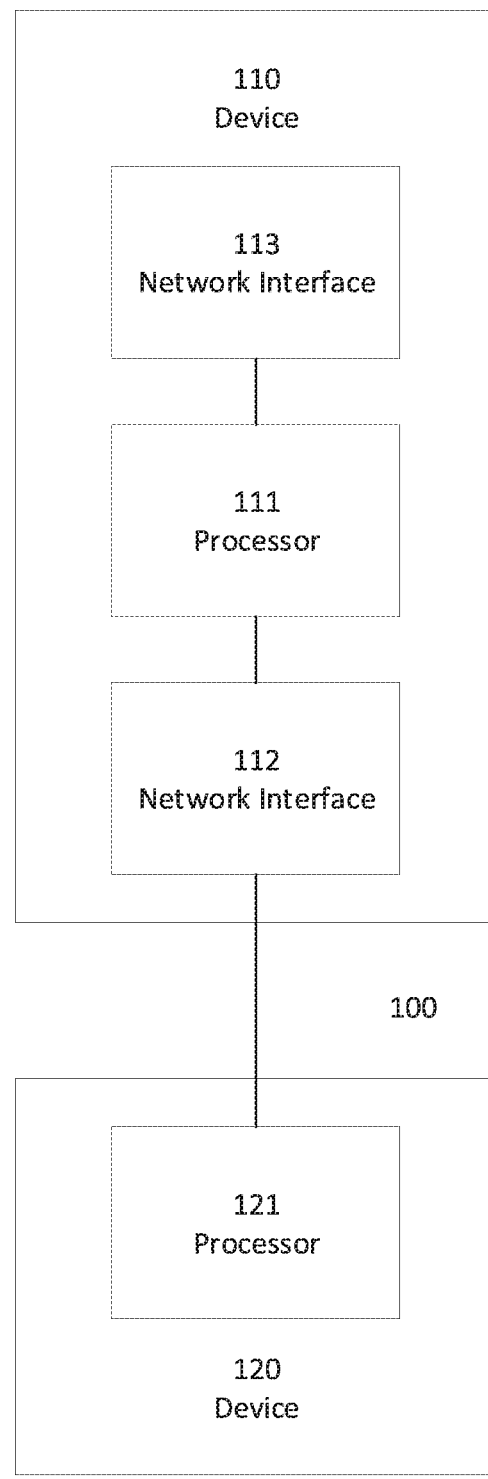
FIG. 1 is a schematic block diagram of an exemplary system, according to some embodiments of the present invention.

The present invention, in some embodiments thereof, relates to a digital communication network and, more specifically, but not exclusively, to a digital communication network providing secure connectivity to a plurality of home utility metering devices.

For brevity, henceforth the term "network" is used to mean a digital communication network. As used herein, the term "digital communication network" includes, but is not limited to, a Local Area Network (LAN) or a HAN, for example an Ethernet network, a WiFi network or a ZigBee Alliance ZigBee network, and a Wide Area Network (WAN), for example a cellular network or the Internet.

Digital signing is a technique that binds an entity to a set of digital data. The binding between the entity and the set of digital data can be independently verified by a receiver of the set of digital data as well as any third party. A digital signature is a cryptographic value calculated from the set of digital data and a secret key value. The cryptographic value may be computed using a symmetric cryptographic method, where both a signer and a receiver of the set of digital data know the secret key value. The cryptographic value may be computed using an asymmetric cryptographic method, where the signer computes the cryptographic using a private key value and a receiver verifies the binding using a public key value associated with the private key value. In the area of digital communication networks, digitally signing a message sent from a sender to a receiver allows the receiver to discard a message received from an unauthorized sender. In addition, digitally signing the message reduces a risk of an unauthorized sender from gaining access to the receiver by manipulating a message sent from an authorized sender.

In the area of Internet of Things (IoT), there exist solutions for provisioning and authenticating an IoT device to allow the IoT device to communicate in an identified network. However, such solutions do not address malicious attacks on an IoT device, where network traffic to or from an authenticated and authorized IoT device is tampered with, for the purpose of interfering with operation of the IoT device and additionally or alternatively operation of a remote server.

There is a trend to reduce costs of smart meter devices, therefore a smart meter device may have limited computing resources. To use a digital signature for traffic received by or sent to a smart meter device, there is a need for a digital signature method which requires low computation power and additionally or alternatively requires a small amount of memory, so the digital signature method may be executed by a smart meter device without increasing cost of manufacturing the smart meter device, while at the same time being efficient enough so as not to reduce the smart meter device's performance, for example not increasing processing latency or reducing processing throughput of the smart meter device.

For brevity, henceforth the term "device" means a network connected device. The network connected device may be specifically, but not exclusively, a smart utility meter. The network connected device is optionally a computerized server, providing a service via a digital communication network, for example a utility service. The network connected device is optionally a secured network connected device, implementing one or more methods of reducing a risk of being attacked.

The present invention, in some embodiments thereof, proposes computing a cryptographic signature value for a sequence of digital bytes that are to be sent to another secured device by applying a fixed length low computation complexity chunk-based hash function, i.e. a chunk-based hash function having a low computation complexity that produces a cryptographic signature value having an identified fixed length regardless of an amount of bytes of the sequence of digital bytes, and sending the sequence of digital bytes to the other secured device with the cryptographic signature value. In such embodiments, an identified cryptographic key value is appended to the sequence of digital bytes to produce an extended sequence of digital bytes and the fixed length low computation complexity chunk-based hash function is computed using the extended sequence of digital bytes. Optionally, the extended sequence of digital bytes is partitioned into a sequence of chunks. Optionally, a low computation complexity chunk-hash function is applied to each chunk of the sequence of chunks, in an identified chunk order, to update a sequence of hash values, and the cryptographic signature value is optionally computed using the updated sequence of hash values. Using a sequence of hash values to compute the cryptographic signature value facilitates producing a cryptographic value having the identified fixed length regardless of the amount of bytes of the sequence of digital bytes. Using a cryptographic signature value having a fixed length limits an adverse impact to effective network throughput due to using some of the digital communication network's bandwidth to send the cryptographic signature value, increasing availability of a service provided by a system implemented according to the present invention. Computing the cryptographic signature value using the extended sequence of digital values comprising the cryptographic key value reduces a probability of an unauthorized sender, not having access to the cryptographic key value, generating a correct cryptographic signature value and thus increases reliability of a system implemented according to the present invention. Partitioning the extended sequence of bytes and updating the sequence of hash values using one chunk of the sequence of chunks at a time further facilitates computing a cryptographic signature value having a fixed length regardless of an amount of bytes of the sequence of digital bytes, thus limiting adverse impact to effective network throughput.

Optionally, applying the low computation complexity chunk-hash functions comprises extending an array of digital words of each chunk of the sequence of chunks by applying a first plurality of bitwise operations to a plurality of values of the array of digital words. Some examples of a bitwise operation are bitwise negation of a value, a bitwise logical AND operation between two values, and a bitwise logical exclusive OR (XOR) operation between two values and a bitwise shift of a value in an identified direction of an identified amount of bits. A bitwise operation typically requires an identified small amount of memory and an identified small amount of computation cycles. Using a first plurality of bitwise operations to extend the array of digital words allows reducing an amount of computation resources required to extend the array of digital words, thus reducing cost of manufacturing and cost of operation of a secured device. Extending the array of digital words increases randomness of the computed cryptographic signature value, increasing reliability of a system implemented according to the present invention.

Optionally, the sequence of hash values is updated by applying a second plurality of bitwise operations to each of the array of digital words. Using the second plurality of bitwise operations to update the sequence of hash values allows reducing an amount of computation resources required to update the sequence of hash values, thus reducing cost of manufacturing and cost of operation of a secured device.

In some embodiments of the present invention each byte of the extended sequence of digital bytes is converted into a sequence of 8 8-bit American Standard Code for Information Interchange (ASCII) values, each representing a respective binary bit of a sequence of 8 bits of the byte. Converting each byte into a sequence of 8 ASCII values facilitates implementing the present invention using a programming resource having a textual input mechanism, for example some optimized versions of embedded ARM compiled code, where there is a need to prevent interpreting a byte value of zero as an indication of a boundary of a textual string.

In addition, in some embodiments of the present invention, on the other secured device a new cryptographic signature value is computed by applying the fixed length low computation complexity chunk-based hash function to a plurality of extracted digital bytes extracted from a received message and extended by appending the identified cryptographic key value to the plurality of extracted digital bytes. In such embodiments, the received message is provided to a software object executing on the other secured device for the purpose of performing a message related task subject to the new cryptographic signature value being equal a received cryptographic signature value extracted from the received message. Using the identified cryptographic key value to compute the new cryptographic signature value reduces cost of deployment and cost of operation of a system implemented according to the present invention compared to a system using public/private key pairs as generation of a symmetrical key value is simpler than generation of a public/private key pair.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

For brevity, henceforth the term "network interface" means "at least one digital communication network interface" and the terms are used interchangeably. In addition, for brevity henceforth the term "processor" is used to mean "at least one hardware processor".

Reference is now made to FIG. 1, showing a schematic block diagram of an exemplary system 100, according to some embodiments of the present invention. In such embodiments at least one device 110 comprises processor 111 and network interface 112, electrically connected to processor 111. Optionally, at least one device 110 is connected to at least one other device 120, optionally comprising other processor 121, optionally via network interface 112. Optionally, network interface 112 is connected to a Global System for Mobile communications (GSM) network. Optionally, at least one device 110 comprises another network interface 113, optionally electrically connected to processor 111. Optionally, other network interface 113 is connected to another digital communication network. Optionally, the other digital communication network is a private network, for example a Local Area Network of a home. Optionally, the other digital communication network is a wireless network, for example a wireless digital communication network based on IEEE 802.15.4 standard, such as a Zigbee Alliance Zigbee network. Optionally, at least one device 110 is connected to at least one additional hardware processor (not shown) via other network interface 113, for example a hardware processor of an IoT device.

To provide secure network communication between at least one device 110 and at least one other device 120, in some embodiments of the present invention system 100 implements the following optional method.

Figure 2:
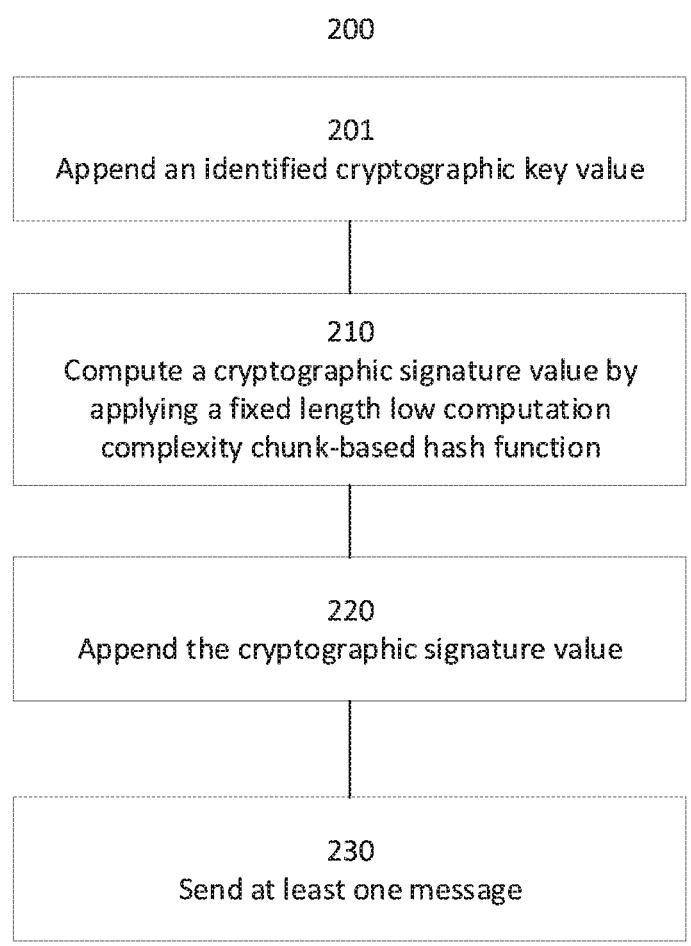
FIG. 2 is a flowchart schematically representing an optional flow of operations for a secured digital communication system, according to some embodiments of the present invention.

Reference is now made also to FIG. 2, showing a flowchart schematically representing an optional flow of operations 200 for a secured digital communication system, according to some embodiments of the present invention. In such embodiments, in at least one of a plurality of iterations, processor 111 appends in 201 an identified cryptographic key value to a first sequence of digital bytes, to produce an extended sequence of digital bytes. Optionally, the first sequence of digital bytes is received from the additional hardware processor via other network interface 113. Optionally, the first sequence of digital bytes is generated by processor 111. In 210, processor 111 optionally computes a cryptographic signature value. Optionally, processor 111 computes the cryptographic signature value by applying a fixed length low computation complexity chunk-based hash function to the extended sequence of digital bytes.

Figure 3:
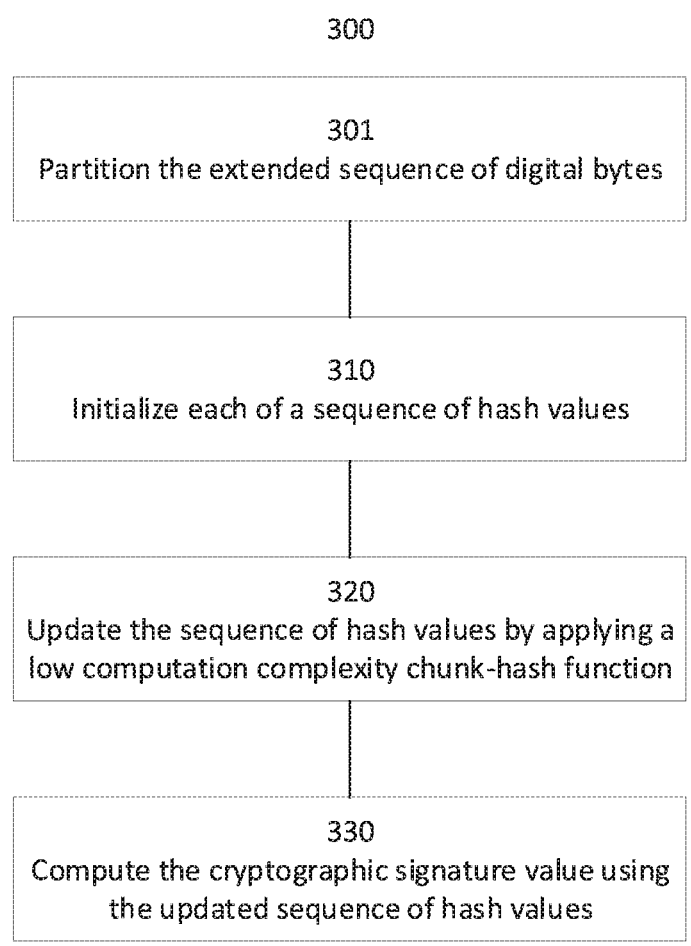
FIG. 3 is a flowchart schematically representing an optional flow of operations for applying a chunk-based hash function, according to some embodiments of the present invention.

Reference is now made also to FIG. 3, showing a flowchart schematically representing an optional flow of operations 300 for applying a chunk-based hash function, according to some embodiments of the present invention. In such embodiments, in 301 processor 111 partitions the extended sequence of digital bytes into a sequence of chunks, each comprising an array of digital words, each digital word comprising a sequence of binary bits. Optionally, the array comprises 16 digital words. Optionally, each digital word comprises a sequence of 32 binary bits.

Figure 4:
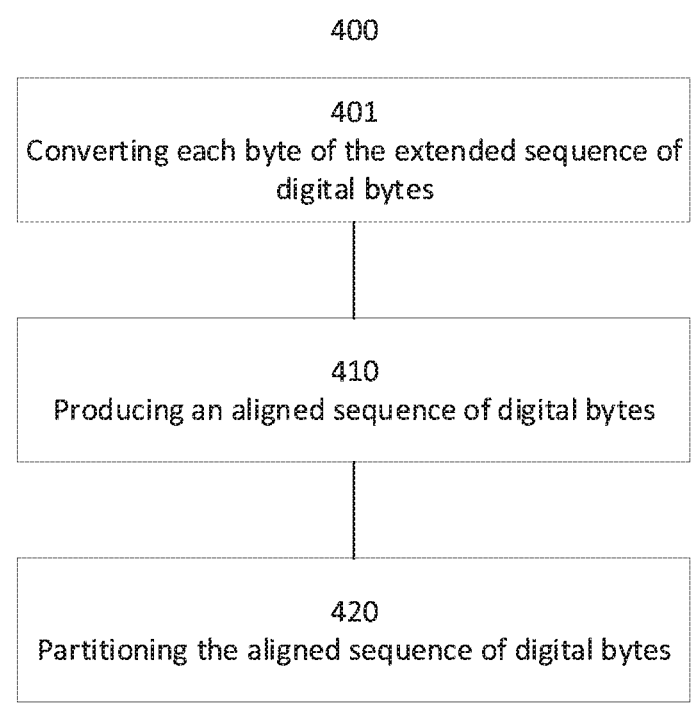
FIG. 4 is a flowchart schematically representing an optional flow of operations for partitioning a sequence of digital bytes, according to some embodiments of the present invention.

Reference is now made also to FIG. 4, showing a flowchart schematically representing an optional flow of operations 400 for partitioning a sequence of digital bytes, according to some embodiments of the present invention. In such embodiments, when the array comprises 16 digital words each comprising a sequence of 32 binary bits, in 410 processor 111 produces an aligned sequence of digital bytes having an amount of binary bits which is an integral multiple of 512. Optionally, processor 111 produces the aligned sequence of digital bytes by appending to the extended sequence of digital bytes a plurality of binary bits, each having a value of 0 and another 64 bits representing a length value. Optionally, the length value is indicative of an amount of bits in the extended sequence of digital bytes. Optionally, the length value is indicative of an amount of bytes in the extended sequence of digital bytes. Optionally, before producing the aligned sequence of digital bytes, processor 111 converts in 401 each byte of the extended sequence of digital bytes into a sequence of 8 8-bit ASCII values to produce a sequence of character bytes. Optionally, when each digital byte comprises a sequence of 8 bits, each 8-bit ASCII value represents a respective binary bit of the sequence of 8 bits. \x30 is a hexadecimal representation of an 8-bit ASCII value 00110000 of the character '0'. \x31 is a hexadecimal representation of an 8-bit ASCII value 00110001 of the character '1'. In an example of converting a digital byte into a sequence of 8 8-bit ASCII values, when a digital byte has a value comprising a binary sequence of bits 01000011 (hexadecimal representation \x43), in 401 processor 111 converts the digital byte \x43 to the sequence of 8-bit ASCII values:

\x30\x31\x30\x30\x30\x30\x31\x31

Optionally, processor 111 uses the sequence of character bytes produced in 401 as the extended sequence of digital bytes in 410.

Optionally, processor 111 appends a value representing 1 to the end of the sequence of digital bytes. When the sequence of digital bytes is the sequence of character bytes, processor 111 optionally appends an 8-bit ASCII value \x31. Optionally, processor 111 appends a bit having a value of 1.

In 420, processor 111 optionally partitions the aligned sequence of digital bytes into the sequence of chunks, each comprising 16 digital words, each digital word comprising a sequence of 32 binary bits, such that each chunk comprises 512 binary bits.

Reference is now made again to FIG. 3. In 310, processor 111 optionally initializes each of a sequence of hash values with a respective predefined hash value of a sequence of predefined hash values. For example, a possible sequence of predefined hash values, each represented as a sequence of 32 binary bits, is:

```
01100111010001010010001100000001,
11101111110011011010101110001001,
10011000101110101101110011111110,
00010000001100100101010001110110,
11000011101001011100001111110000.
```

In 320, for each chunk of the sequence of chunks, processor 111 optionally updates the sequence of hash values by applying a low computation complexity chunk-hash function to the array of the chunk and the sequence of hash values updated for a previous chunk. Optionally, processor 111 updates the sequence of hash values for each chunk in an identified order of the sequence of chunks. Optionally, the identified order is according to the sequence of chunks.

Figure 5:
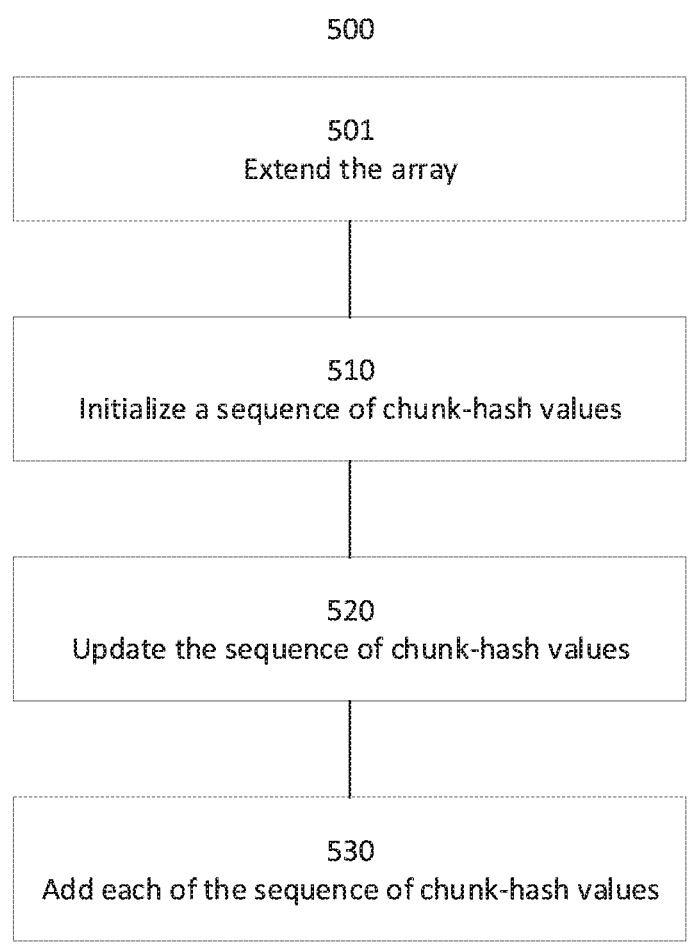
FIG. 5 is a flowchart schematically representing an optional flow of operations for applying a chunk-hash function, according to some embodiments of the present invention.

Reference is now made also to FIG. 5, showing a flowchart schematically representing an optional flow of operations 500 for applying a chunk-hash function, according to some embodiments of the present invention. In such embodiments, in 501 processor 111 extends the array. For example, when the array comprises 16 digital words, processor 111 optionally extends the array to comprise 20 digital words. Optionally, processor 111 extends the array by appending to the array 4 extension words. Optionally, each of the extension words is computed for one of four selected index values. In one example, the four selected index values are 16, 17, 18, 19. Optionally, for each of the selected index values, processor 111 applies a first plurality of bitwise operations to a plurality of values of the array, selected according to respective selected index value. For example, when:

array denotes a chunk's array of digital words, optionally initially comprising 16 digital words,
i denotes a selected index value,
array[i] denotes a value of a word at index i of array array,
wordA, wordB, wordC and wordD denote digital word values of the array selected according to i,
XOR denotes a bitwise logical XOR operator between 2 values,
x leftRotate z denotes a bitwise shift operator shifting left a value denoted by x an amount of times denoted by z,
xorA, xorB, and xorC denote computed values, and
leftRotated denotes a computed extension value,
a possible first plurality of bitwise operations is:
wordA=array[i-3]
wordB=array [i-8]
wordC=array[i-14]
wordD=array[i-16]
xorA=wordA XOR wordB
xorB=xorA XOR wordC
xorC=xorB XOR wordD
leftRotated=xorC leftRotate 1

Optionally, processor 111 appends computed extended value denoted by leftRotated at the end of the array denoted by array.

In 510, processor 111 optionally initialized a sequence of chunk-hash values using the sequence of hash values, optionally updated for a previous chunk. In 520, processor 111 optionally updates the sequence of chunk-hash values for each digital work of the array, optionally in order of the digital words in the array. For example, when the array comprises 20 digital words, processor 111 updates the sequence of chunk-hash values for each of the 20 digital words. Optionally, for each digital word, processor 111 updates the sequence of chunk-hash values by applying a second plurality of bitwise operations to the digital word and the sequence of chunk-hash values updated for a previous digital word. Optionally, processor 111 updates the sequence of chunk—has values according to a position of the digital word in the array, such that for a first position of the digital word in the array processor 111 applies to the digital word and the sequence of chunk-hash values a first subset of the second plurality of bitwise operations and for a second position of the digital word in the array processor 111 applies to the digital word and the sequence of chunk-hash values a second subset of the second plurality of bitwise operations.

In one example:
the sequence of hash values is a sequence of 5 hash values denoted by h1, h2, h3, h4, h5, respectively,
the sequence of chunk-hash values is a sequence of 5 chunk-hash values denoted by a, b, c, d, and e, respectively,
j denotes an index of array array,
f, k, and temp denote computed values,
AND denotes a bitwise logical AND operator between 2 values,
OR denotes a bitwise logical OR operator between 2 values,
++ denotes and increment operator, and
a possible second plurality of bitwise operations is:

```
for (j = 0; j < 20; j++) {
    if(j < 5) {
        f = (b AND c) OR ((NOT b) AND d);
        k = '01011010100000100111100110011001';
    }
    else if (j < 10) {
        f = (b XOR c) XOR d;
        k = '01101110110110011110101110100001';
    }
    else if (j < 15) {
        f = (b AND c) OR (b AND d) OR (c AND d);
        k = '10001111000110111011110011011100';
    }
    else {
        f = (b XOR c) XOR d;
        k = '11001010011000101100000111010110';
    }
    temp = (a leftRotate 5) + f + e + k + array[j];
    e = d;
    d = c;
    c = (b leftRotate 30);
    b = a;
    a = temp;
```

In 530, processor 111 optionally adds each of the sequence of chunk-hash values to the respective hash value of the sequence of hash values. For example:

$$h0=h0+a;$$

$$h1=h1+b;$$

$$h2=h2+c;$$

$$h3=h3+d;$$

$$h4=h4+e;$$

Optionally, processor 111 truncates each of the sequence of hash values to a sequence of 32 binary bits.

Figure 6:
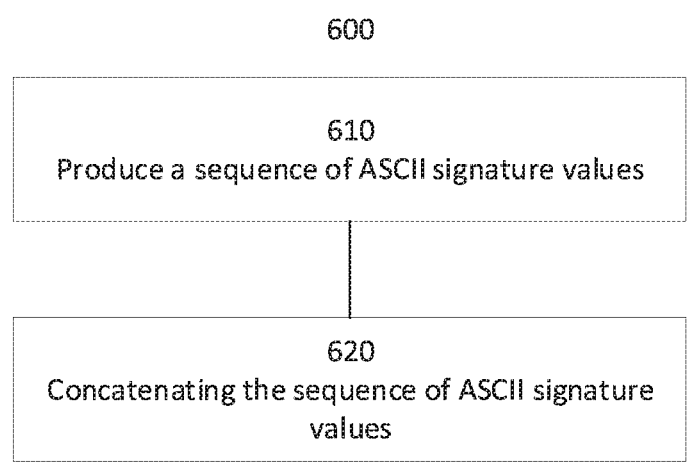
FIG. 6 is a flowchart schematically representing an optional flow of operations for computing a signature value, according to some embodiments of the present invention.

Reference is now made again to FIG. 3. In 330, processor 111 optionally computes the cryptographic signature value using the updated sequence of hash values. Reference is now made also to FIG. 6, showing a flowchart schematically representing an optional flow of operations 600 for computing a signature value, according to some embodiments of the present invention. In such embodiments, in 610 processor 111 produces a sequence of ASCII signature values using the sequence of updated hash values. Optionally, processor 111 converts each of the sequence of updated hash values into an ASCII-code representation of a hexadecimal representation of the updated hash value. For example, when a hexadecimal representation of an updated hash value is \x1A0B processor 111 may convert the updated hash value to ASCII-code \x31\x41\x30\x42 representing sequence of characters '1A0B'. Optionally, in 620 processor 111 concatenates the sequence of ASCII signature values to produce the cryptographic signature value.

Reference is now made again to FIG. 2. In 220, processor 111 optionally appends the cryptographic signature value to the first sequence of digital bytes to produce a signed sequence of digital bytes and in 230 processor 111 optionally sends at least one message comprising the signed sequence of digital bytes to at least one other device 120, optionally via network interface 112.

In some embodiments of the present invention, other device 120 uses the cryptographic signature value to determine whether to provide a message to a software object, executed by processor 121, for the purpose of performing a message related task. In such embodiments, system 100 further implements the following non-mandatory method.

Figure 7:
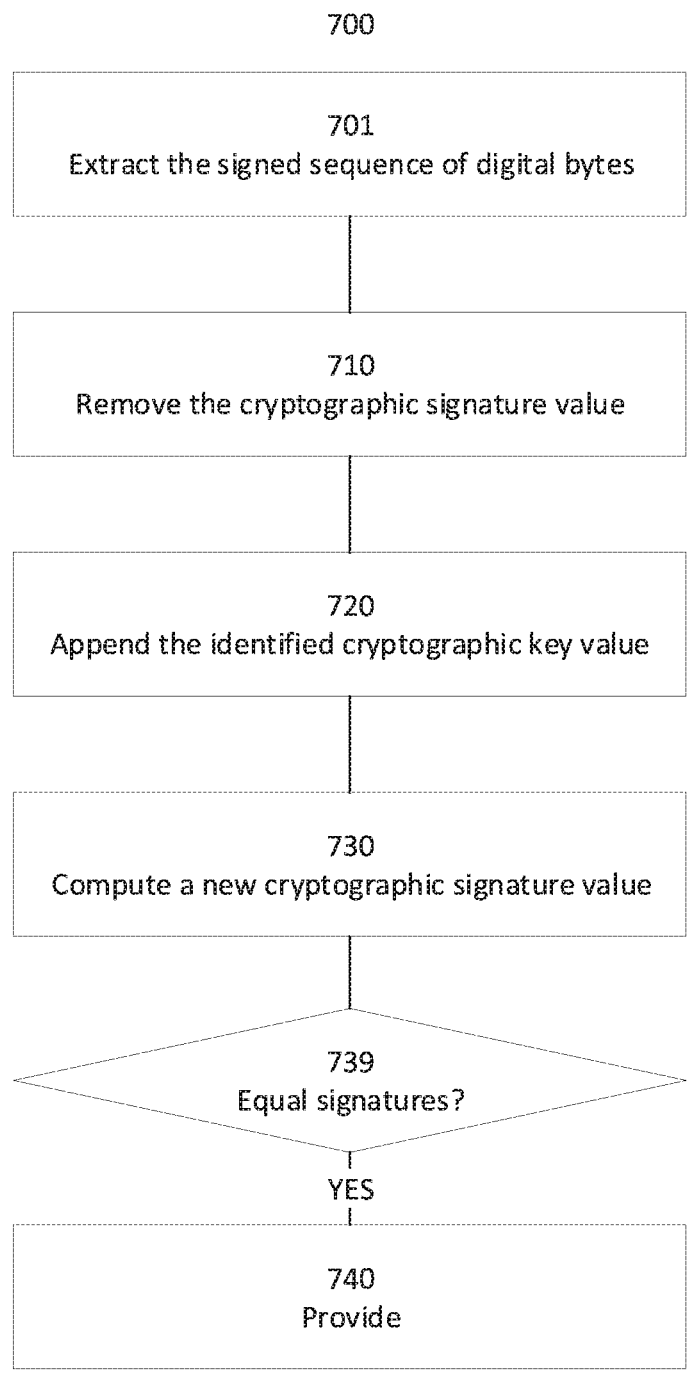
FIG. 7 is a flowchart schematically representing an optional flow of operations for receiving a signed message, according to some embodiments of the present invention.

Reference is now made also to FIG. 7, showing a flowchart schematically representing an optional flow of operations 700 for receiving a signed message, according to some embodiments of the present invention. In such embodiments, processor 121 executes a plurality of receive iterations. In at least one of the plurality of receive iterations, processor 121 optionally receives in 701 at least one message from at least one device 110 and optionally extracts the signed sequence of digital bytes from the at least one message. Optionally, In 710, processor 121 removes the cryptographic signature value from the signed sequence of digital bytes to produce a stripped sequence of digital bytes. Optionally, the stripped sequence of digital bytes is the first sequence of digital bytes. In 720, processor 121 optionally appends the identified cryptographic key value to the stripped sequence of digital bytes to produce an extended stripped sequence of digital bytes, and in 730 processor 121 optionally computes a new cryptographic signature value by applying the fixed length low computation complexity chunk-based hash function to the extended stripped sequence of digital bytes. Optionally, processor 121 executes flow of operations 300. In 739, processor 121 optionally compares the new cryptographic signature value to the cryptographic signature value removed from the signed sequence of digital bytes. In 740, processor 121 optionally provides the at least one message to at least one software object executed by processor 121 for the purpose of performing a message related task. An example of a message related task is extracting one or more values from the at least one message. Another example of a message related task is updating one or more device values according to the one or more values extracted from the at least one message. For example, when at least one device 110 is a smart utility meter and at least one other device 120 is a utility server, processor 121 may update one or more billing values of a client according to one or more usage values extracted from the at least one message. Optionally, in 740, processor 121 provides the at least one message to the at least one software object subject to the new cryptographic signature value being equal to the cryptographic signature value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant network connected devices will be developed and the scope of the term network connected device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A secured digital communication system, comprising:
at least one secured network connected device, comprising at least one hardware processor connected to at least one digital communication network interface, and adapted for:
in at least one of a plurality of iterations:
generating a cryptographic signature by:
producing an extended sequence of digital bytes by appending an identified cryptographic key value to a first sequence of digital bytes; and
computing a cryptographic signature value by applying a fixed length low computation complexity chunk-based hash function to the extended sequence of digital bytes;
producing a signed sequence of digital bytes by appending the computed cryptographic signature value to the first sequence of digital bytes; and
sending at least one message comprising the signed sequence of digital bytes to at least one other secured network connected device via the at least one digital communication network interface.

2. The system of claim 1, wherein applying the fixed length low computation complexity chunk-based hash function comprises:

partitioning the extended sequence of digital bytes into a sequence of chunks, each comprising an array of digital words, each digital word comprising a sequence of binary bits;
initializing each of a sequence of hash values with a respective predefined hash value of a sequence of predefined hash values;
for each chunk of the sequence of chunks, in an identified chunk order of the sequence of chunks, updating the sequence of hash values by applying a low computation complexity chunk-hash function to the array of the chunk and the sequence of hash values updated for a previous chunk; and
computing the cryptographic signature value using the updated sequence of hash values.

3. The system of claim 2, wherein the identified chunk order is according to the sequence of chunks.

4. The system of claim 2, wherein the array comprises 16 digital words; and
wherein applying the low computation complexity chunk-hash function to the array and the sequence of hash values comprises:
extending the array to comprise 20 digital words by appending to the array 4 extension words, each computed for one of four selected index values, by applying a first plurality of bitwise operations to a plurality of values of the array selected according to respective selected index value;
initializing a sequence of chunk-hash values using the sequence of hash values;
for each digital word of the array, in order of the 20 digital words in the array, updating the sequence of chunk-hash values by applying a second plurality of bitwise operations to the digital word and to the sequence of chunk-hash values updated for a previous digital word, according to a position of the digital word in the array; and
adding each of the sequence of chunk-hash values to the respective hash value of the sequence of hash values.

5. The system of claim 2, wherein each digital word of the array of digital words comprises a sequence of 32 binary bits; and
wherein partitioning the extended sequence of digital bytes into a sequence of chunks comprises:
producing an aligned sequence of digital bytes having an amount of binary bits which is an integral multiple of 512 by appending to the extended sequence of digital bytes a plurality of binary bits, each having a value of 0, and 64 bits representing a length value; and
partitioning the aligned sequence of digital bytes into the sequence of chunks, each comprising 16 digital words each comprising a sequence of 32 binary bits.

6. The system of claim 5, wherein partitioning the extended sequence of digital bytes into a sequence of chunks further comprises:
before producing the aligned sequence of digital bytes, converting each byte of the extended sequence of digital bytes, comprising a sequence of 8 bits, into a sequence of 8 8-bit American Standard Code for Information Interchange (ASCII) values, each representing a respective binary bit of the sequence of 8 bits, to produce a sequence of character bytes; and
using the sequence of character bytes as the extended sequence of digital bytes when producing the aligned sequence of digital bytes.

7. The system of claim 5, wherein the length value is indicative of an amount of bits in the extended sequence of digital bytes.

8. The system of claim 2, wherein computing the cryptographic signature value using the updated sequence of hash values comprises:
producing a sequence of ASCII signature values by converting each of the sequence of updated hash values into an ASCII-code representation of a hexadecimal representation of the updated hash value; and
concatenating the sequence of ASCII signature values to produce the cryptographic signature value.

9. The system of claim 1, wherein at least one digital communication network interface is connected to a Global System for Mobile communications (GSM) network.

10. The system of claim 1, wherein the first sequence of digital bytes is received from at least one additional hardware processor via at least one other digital communication network interface.

11. The system of claim 10, wherein the at least one other digital communication network interface is connected to a wireless digital communication network based on Institute of Electrical and Electronics Engineers (IEEE) 802.15.4 technical standard.

12. The system of claim 11, wherein the wireless digital communication network based on IEEE 802.15.4 technical standard is a Zigbee Alliance Zigbee network.

13. The system of claim 1, wherein the at least one other secured network connected device comprises at least one other hardware processor adapted for:
in at least one of a plurality of receive iterations:
extracting the signed sequence of digital bytes from at least one message received from the at least one secured network connected device;
removing the cryptographic signature value from the signed sequence of digital bytes to produce a stripped sequence of digital bytes;
appending the identified cryptographic key value to the stripped sequence of digital bytes to produce an extended stripped sequence of digital bytes;
computing a new cryptographic signature value by applying the fixed length low computation complexity chunk-based hash function to the extended stripped sequence of digital bytes; and
providing the at least one message to at least one software object executed by the at least one other hardware processor for the purpose of performing a message related task, subject to the new cryptographic signature value being equal to the cryptographic signature value.

14. A method for a secured digital communication system, comprising:
on at least one secured network connected device, in at least one of a plurality of iterations:
generating a cryptographic signature by:
producing an extended sequence of digital bytes by appending an identified cryptographic key value to a first sequence of digital bytes; and
computing a cryptographic signature value by applying a fixed length low computation complexity chunk-based hash function to the extended sequence of digital bytes;
producing a signed sequence of digital bytes by appending the computed cryptographic signature value to the first sequence of digital bytes; and
sending the signed sequence of digital bytes to at least one other secured network connected device via at least one digital communication network interface.

15. The method of claim 14, further comprising:
on the at least one other secured network connected device, in at least one of a plurality of receive iterations:
extracting the signed sequence of digital bytes from at least one message received from the at least one secured network connected device;
removing the cryptographic signature value from the signed sequence of digital bytes to produce a stripped sequence of digital bytes;
appending the identified cryptographic key value to the stripped sequence of digital bytes to produce an extended stripped sequence of digital bytes;
computing a new cryptographic signature value by applying the fixed length low computation complexity chunk-based hash function to the extended stripped sequence of digital bytes; and
providing the at least one message to at least one software object executed by the at least one hardware processor for the purpose of performing a message related task, subject to the new cryptographic signature value being equal to the cryptographic signature value.

* * * * *